United States Patent
Balaga et al.

(10) Patent No.: US 11,074,243 B2
(45) Date of Patent: Jul. 27, 2021

(54) APPLYING DYNAMIC DEFAULT VALUES TO FIELDS IN DATA OBJECTS

(71) Applicant: Microsoft Technology Licensing, LLC, Redmond, WA (US)

(72) Inventors: Sirish Kumar Balaga, Sunnyvale, CA (US); Xiang Zhang, San Jose, CA (US); Kevin Tse-Long Fu, Sunnyvale, CA (US); Sriram Panyam, Santa Clara, CA (US)

(73) Assignee: Microsoft Technology Licensing, LLC, Redwood Shores (CA)

( * ) Notice: Subject to any disclaimer, the term of this patent is extended or adjusted under 35 U.S.C. 154(b) by 571 days.

(21) Appl. No.: 15/921,069

(22) Filed: Mar. 14, 2018

(65) Prior Publication Data

US 2019/0286727 A1  Sep. 19, 2019

(51) Int. Cl.
*G06F 16/23* (2019.01)
*G06F 16/2453* (2019.01)

(52) U.S. Cl.
CPC ...... *G06F 16/2379* (2019.01); *G06F 16/2365* (2019.01); *G06F 16/2372* (2019.01); *G06F 16/2453* (2019.01); *G06F 16/23* (2019.01)

(58) Field of Classification Search
CPC .. G06F 16/2379; G06F 16/2365; G06F 16/23; G06F 16/2372; G06F 16/2453

USPC ......................................................... 707/690
See application file for complete search history.

(56) References Cited

U.S. PATENT DOCUMENTS

| | | | | |
|---|---|---|---|---|
| 8,301,997 B2* | 10/2012 | Ticknor | ............... | G06F 16/289 715/234 |
| 2008/0162264 A1* | 7/2008 | Bloching | ............... | G06Q 10/00 719/330 |
| 2015/0161139 A1* | 6/2015 | Wang | ................ | G06F 16/24578 707/735 |
| 2016/0188905 A1* | 6/2016 | Woss | .................. | G06F 16/9535 707/722 |

* cited by examiner

*Primary Examiner* — Shahid A Alam (74) *Attorney, Agent, or Firm* — Hickman Becker Bingham Ledesma LLP (57) ABSTRACT

The disclosed embodiments include a system for processing data. During operation, the system obtains, for a field in a data object, a set of diffs containing default values for the field and a set of mappings representing a set of conditions associated with the data object. Next, the system matches an attribute associated with an instance of the data object to a condition in the set of conditions. The system then uses the mappings to identify, in the set of diffs, a diff to be applied under the condition. Finally, the system updates the field in the instance with a default value associated with the condition by applying the diff to the instance.

20 Claims, 5 Drawing Sheets

APPLYING DYNAMIC DEFAULT VALUES TO FIELDS IN DATA OBJECTS

BACKGROUND

Field

The disclosed embodiments relate to techniques for updating data objects. More specifically, the disclosed embodiments relate to techniques for applying dynamic default values to fields in data objects.

Related Art

Online networks may include nodes representing individuals and/or organizations, along with links between pairs of nodes that represent different types and/or levels of social familiarity between the nodes. For example, two nodes in network may be connected as friends, acquaintances, family members, classmates, and/or professional contacts. Online networks may further be tracked and/or maintained on web-based networking services, such as online professional networks that allow the individuals and/or organizations to establish and maintain professional connections, list work and community experience, endorse and/or recommend one another, run advertising and marketing campaigns, promote products and/or services, and/or search and apply for jobs.

In turn, online networks may facilitate corporate activities such as marketing, online advertising, hiring, and/or recruiting by the individuals and/or organizations. For example, recruiters may use the online professional network to search for candidates for job opportunities and/or open positions. At the same time, job seekers may use the online professional network to enhance their professional reputations, conduct job searches, reach out to connections for job opportunities, and apply to job listings. Consequently, use of online professional networks may be increased by improving the data and features that can be generated, queried, updated, and/or accessed through the online professional networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
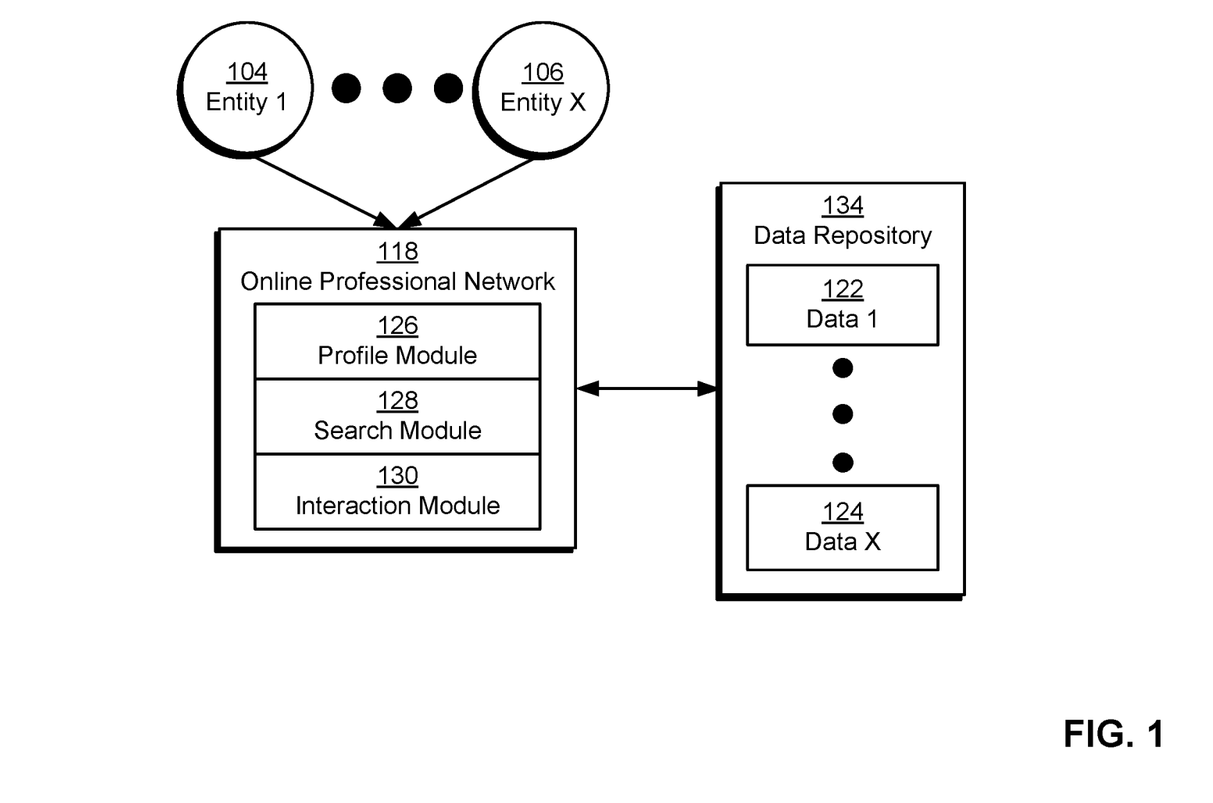
FIG. 1 shows a schematic of a system in accordance with the disclosed embodiments.

The disclosed embodiments provide a method, apparatus, and system for processing data. As shown in FIG. 1, the data may be associated with a user community, such as an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

More specifically, online professional network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online professional network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online professional network 118 also includes a search module 128 that allows the entities to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature in online professional network 118 to search for profiles, jobs, and/or information by categories such as first name, last name, title, company, school, location, interests, relationship, skills, industry, groups, salary, experience level, etc.

Online professional network 118 further includes an interaction module 130 that allows the entities to interact with one another on online professional network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest posts, articles, and/or updates from the entities' connections and/or groups to the entities. Similarly, online professional network 118 may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online professional network 118 may be tracked and stored in a database, data warehouse, cloud storage, and/or other data-storage mechanism providing data repository 134.

In one or more embodiments, online professional network 118 includes functionality to update data in data repository 134 with dynamic default values of fields in the data. Such dynamic default values may be applied based on conditions associated with the data. For example, online professional network 118 may set default values for privacy settings of the entities based on the entities' locations, ages, entity types (e.g., regular user, premium user, company, school, etc.), and/or other attributes.

Figure 2:
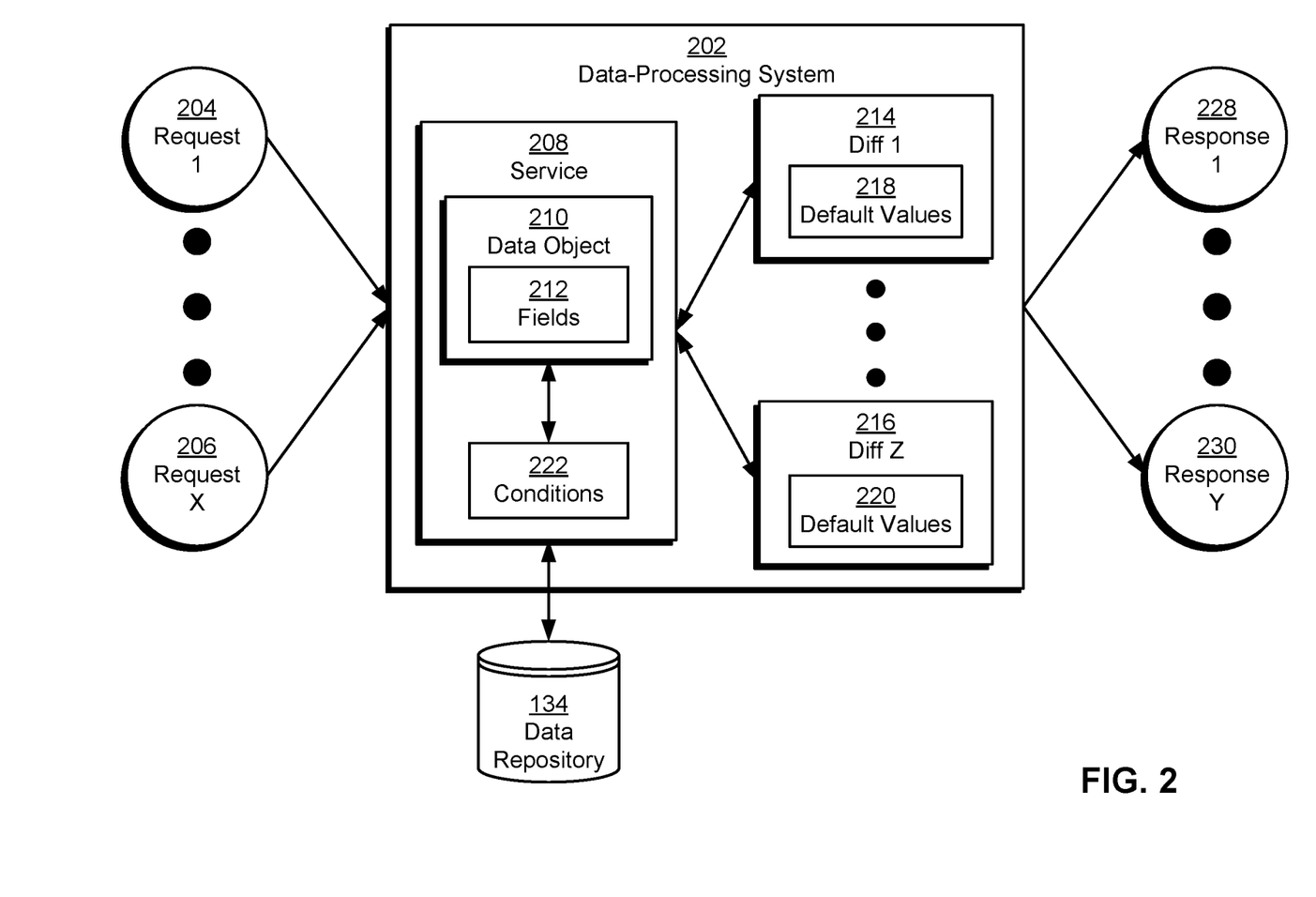
FIG. 2 shows a data-processing system in accordance with the disclosed embodiments.

As shown in FIG. 2, a data-processing system 202 may be used with or within an online network (e.g., a social network, online professional network 118 of FIG. 1, and/or another community of users), which may include a distributed application and/or set of services. Data-processing system 202 receives requests (e.g., request 1 204, request x 206) related to a data object 210 from the application and/or services and generates responses (e.g., response 1 228, response y 230) to the requests.

More specifically, data-processing system 202 includes a service 208 that applies one or more default values 218-220 to fields 212 in various instances of data object 210, and returns the instances in response to requests from other services and/or entities. For example, service 208 may provide an application-programming interface (API) that allows other applications, services, and/or entities to transmit requests related to instances of data object 210 to service 208. Next, service 208 may obtain one or more parameters from each request and use the parameter(s) to generate and/or modify one or more instances of data object 210. Service 208 may then transmit the instance(s) in a response to the request.

Data object 210 includes one or more fields 212 that are stored and/or modified by data-processing system 202. For example, data object 210 may include a variable, data structure, function, and/or method for accessing fields 212 representing privacy settings for members of the online network. An exemplary schema for storing privacy settings in data object 210 includes the following:

```
{
  "type":"record",
  "name":"PrivacySettings",
  "namespace":"com.linkedin.identity",
  "doc":"Privacy settings for a member.",
  "fields":[
    {
      "name":"memberId",
      "type":"long",
      "doc":"Unique identifier for the member",
    },
    {
      "name":"showFullLastName",
      "type":"boolean",
      "doc":"Whether to show member's full last name in profile"
      "default": true
    },
    {
      "name":"showPictureSetting",
      "type":"com.linkedin.identity.setting.NetworkVisibilitySetting",
      "doc":"Setting for who can view a member's profile picture",
      "default": "NETWORK"
    }
  ]
}
```

The exemplary schema above includes a name of "PrivacySettings" for data object 210, a namespace of "com.linkedin.identity," and a description of "Privacy settings for a member." The exemplary schema also includes three fields 212. The first field has a name of "memberId," a type of "long," and a description of "Unique identifier for the member." The second field has a name of "showFullLastName," a type of "boolean," and a description of "Whether to show member's full last name in profile." The third field has a name of "showPictureSetting," a type of "com.linkedin.identity.setting.NetworkVisibilitySetting," and a description of "Setting for who can view a member's profile picture." Thus, the first field may store a member identifier (ID) for a member of the online network, the second field may be set to a true or false value indicating if the member's full last name is to be shown on the member's profile with the online network, and the third field may include a setting for restricting the visibility of the member's profile picture within the online network.

An exemplary schema for the "NetworkVisibilitySetting" type in the "PrivacySettings" data object 210 includes the following:

```
{
  "type":"enum",
  "name":"NetworkVisibilitySetting",
  "namespace":"com.linkedin.identity.setting",
  "symbols":
  [
    "HIDDEN",
```

```
    "CONNECTIONS",
    "NETWORK",
    "LINKEDIN_USER",
    "PUBLIC"
  ]
}
```

The exemplary schema has a type of "enum" and a namespace of "com.linkedin.identity.setting." Possible values for the "enum" include "HIDDEN," "CONNECTIONS," "NETWORK," "LINKEDIN_USER," and "PUBLIC." Consequently, the "showPictureSetting" field of data object 210 may be set to one of the enumerated values to limit the visibility of the member's profile picture to a corresponding set of users (e.g., completely hidden from all users, shown to the member's connections in the online network, shown to the member's extended network in the online network, shown to all members of the online network, or shown to all users).

Referring back to the exemplary schema for the "PrivacySettings" data object 210, the second and third fields of "showFullLastName" and "showPictureSetting" additionally include "default" values (e.g., default values 218-220). In particular, the "showFullLastName" field has a default value of "true," and the "showPictureSetting" field has a default value of "NETWORK." One or more components of data-processing system 202 may apply a default value to a field when the member has not selected a value for the field. Thus, a member that has not specified privacy settings for his/her profile with the online network may be assigned default values that allow showing of the member's full last name and viewing of the member's profile picture by the member's extended network.

On the other hand, the exemplary schemas above lack the ability to assign different default values 218-220 to a given field of data object 210 based on conditions 222 associated with the corresponding instances of data object 210. For example, the "PrivacySettings" schema may be unable to specify, for the "showPictureSetting" field, a default value of "CONNECTIONS" for members in China, a default value of "NETWORK" for members in Europe, and a default value of "PUBLIC" for all other members of the online network. Similarly, the schema may be unable to specify, for the "showFullLastName" field, a default value of "false" for members in China and Europe and a default value of "true" for all other members of the online professional network. Such location-dependent default values may help ensure that member data in the online professional network adheres to country-specific regulations related to data privacy.

A naïve approach to applying default values 218-220 to fields 212 of the "PrivacySettings" data object 210 based on conditions 222 representing member locations of China, Europe, and all other locations may include the following exemplary representation:

```
public class PrivacySettingsGetter {
  private static final Map<PathSpec, Object> CHINA_DEFAULT = new HashMap( );
  private static final Map<PathSpec, Object> EUROPE_DEFAULT = new Hash Map( );
  private static final Map<PathSpec, Object> OTHER_DEFAULT = new HashMap( );
  public PrivacySettingsGetter( ) {
    CHINA_DEFAULT.put(PrivacySettings.fields( ).showFullLastName( ), false);
    CHINA_DEFAULT.put(PrivacySettings.fields( ).showPictureSetting( ), NetworkVisibilitySetting.CONNECTIONS);
    EUROPE_DEFAULT.put(PrivacySettings.fields( ).showFullastName( ), false);
    EUROPE_DEFAULT.put(PrivacySettings.fields( ).showPictureSetting( ), NetworkVisibilitySetting.NETWORK);
    OTHER_DEFAULT.put(PrivacySettings.fields( ).showFullLastName( ), true);
    OTHER_DEFAULT.put(PrivacySettings.fields( ).showPictureSetting( ), NetworkVisibilitySetting.PUBLIC);
  }
  public PrivacySettings getMemberPrivacySettings(long memberId) {
    Location memberLocation =
        ProfileService.getProfile(memberId).getMemberLocation( );
    PrivacySettings memberPrivacySettings = new PrivacySettings( );
    switch (memberLocation) {
    case CHINA:
      Set<PathSpec> fields = CHINA_DEFAULT.keySet( );
      for (PathSpec field : fields) {
        if (field.equals(PrivacySettings.fields( ).showFullLastName( ))) {
          boolean defaultValue = (boolean) CHINA_DEFAULT.get(field);
          memberPrivacySettings.setShowFullLastName(defaultValue);
        } else if (field.equals(PrivacySettings.fields( ).showPictureSetting( ))) {
          NetworkVisibilitySetting defaultValue =
              (NetworkVisibilitySetting) CHINA_DEFAULT.get(field);
          memberPrivacySettings.setShowPictureSetting(defaultValue);
        }
      }
      break;
    case EUROPE:
      fields = EUROPE_DEFAULT.keySet( );
      for (PathSpec field : fields) {
        if (field.equals(PrivacySettings.fields( ).showFullLastName( ))) {
          boolean defaultValue = (boolean)EUROPE_DEFAULT.get(field);
          memberPrivacySettings.setShowFullLastName(defaultValue);
        } else if (field.equals(PrivacySettings.fields( ).showPictureSetting( ))) {
          NetworkVisibilitySetting defaultValue =
              (NetworkVisibilitySetting) EUROPE_DEFAULT.get(field);
          memberPrivacySettings.setShowPictureSetting(defaultValue);
        }
      }
      break;
    case OTHER:
      fields = OTHER_DEFAULT.keySet( );
      for (PathSpec field : fields) {
        if (field.equals(PrivacySettings.fields( ).showFullLastName( ))) {
          boolean defaultValue = (boolean)OTHER_DEFAULT.get(field);
          memberPrivacySettings.setShowFullLastName(defaultValue);
        } else if (field.equals(PrivacySettings.fields( ).showPictureSetting( ))) {
          NetworkVisibilitySetting defaultValue =
              (NetworkVisibilitySetting) OTHER_DEFAULT.get(field);
          memberPrivacySettings.setShowPictureSetting(defaultValue);
        }
      }
      break;
    }
    return memberPrivacySettings;
  }
}
```

In the exemplary representation above, a "PrivacySettingsGetter" class includes a set of hash maps from type "PathSpec" (i.e., a path within a data object) to a generic "Object" type. The hash maps are named "CHINA_DEFAULT," "EUROPE_DEFAULT," AND "OTHER_DEFAULT." A constructor for the class stores, in the hash maps, mappings of paths representing fields 212 in the "PrivacySettings" data object 210 (e.g., "PrivacySettings.fields( ).showFullLastName( )" "PrivacySettings.fields( ).showPictureSetting( )") to default values 218-220 of the fields for the corresponding locations (China, Europe, or all other locations).

A method named "getMemberPrivacySettings" is used to obtain a value of a "memberLocation" variable for a given "memberId." The "memberLocation" variable can be set to "CHINA," "EUROPE" or "OTHER." The "getMemberPrivacySettings" method also retrieves the hash map corresponding to "memberLocation," iterates through all fields in the hash map, and uses an if-else block to cast the default value for each field to the appropriate type before assigning the default value to the field in a set of "memberPrivacySettings" for the "memberId." After the fields are set to the corresponding default values 218-220, the method returns the instance to the caller of the method (e.g., in a response to a request by the caller).

Those skilled in the art will appreciate that the exemplary approach above may be associated with a number of drawbacks. First, the casting of the "Object" type in each hash map to a corresponding type for the default value of each field results in a type-unsafe implementation that can fail during runtime. Second, the maps in "PrivacySettingsGetter" and the if-else block in the "getMemberPrivacySettings" method can grow extremely large as new fields and defaults are added to account for additional privacy settings and/or member locations. In turn, maintenance and/or modifications to code for applying default values to fields 212 in data object 210 become increasingly complex as "PrivacySettingsGetter" and "getMemberPrivacySettings" grow.

In one or more embodiments, in order to avoid these and/or other drawbacks, data-processing system 202 uses a set of differences, or diffs (e.g., diff 1 214, diff z 216), between representations of data object 210 to store default values 218-220 for fields 212 in data object 210 based on conditions 222 associated with the instances. The diffs may be included and/or stored in source code, configuration files, revisions in version control systems, domain-specific languages (DSLs), and/or other representations or repositories.

To update a representation of data object 210 with a set of default values 218-220 based on conditions 222, service 208 applies the diff containing the default values to the representation. For example, service 208 may use a "patch request" method or call to apply the diff to the representation, thereby updating one or more fields 212 in the representation with the corresponding default values. In turn, the diffs may enforce type safety and simplify the addition and/or modification of new default values 218-220 and/or fields 212 associated with various conditions 222.

The use of diffs to store and/or apply default values 218-220 to fields 212 of data object 210 may be illustrated using the following exemplary representation:

```
class PrivacySettingsGetter {
  private static final Map<PathSpec, PatchRequest> CHINA_DEFAULT =
      new Hash Map( );
  private static final Map<PathSpec,
  PatchRequest>EUROPE_DEFAULT =
      new Hash Map( );
  private static final Map<PathSpec, PatchRequest>OTHER_DEFAULT =
      new Hash Map( );
  public PrivacySettingsGetter( ) {
    CHINA_DEFAULT.put(PrivacySettings.fields( ).-
    showFullLastName( ),
    PatchGenerator.diff(new PrivacySettings( ),
       new PrivacySettings( ).setShowFulllLastName(false)));
    CHINA_DEFAULT.put(PrivacySettings.fields( ).showPictureSetting( ),
    PatchGenerator.diff(new PrivacySettings( ), new PrivacySettings( ).
       setShowPictureSetting(NetworkVisibilitySetting.
          CONNECTIONS)));
    EUROPE_DEFAULT.put(PrivacySettings.fields( ).
    showFullastName( ),
    PatchGenerator.diff(new PrivacySettings( ),
       new PrivacySettings( ).setShowFullLastName(false)));
    EUROPE_DEFAULT.put(PrivacySettings.fields( ).
    showPictureSetting( ),
    PatchGenerator.diff(new PrivacySettings( ), new PrivacySettings( ).
       setShowPictureSetting(NetworkVisibilitySetting.NETWORK)));
    OTHER_DEFAULT.put(PrivacySettings.fields( ).-
    showFullLastName( ),
    PatchGenerator.diff(new PrivacySettings( ),
       new PrivacySettings( ).setShowFullLastName(false)));
    OTHER_DEFAULT.put(PrivacySettings.fields( ).-
    showPictureSetting( ),
    PatchGenerator.diff(new PrivacySettings( ), new PrivacySettings( ).
       setShowPictureSetting(NetworkVisibilitySetting.PUBLIC)));
  }
  public PrivacySettings getMemberPrivacySettings(long memberId)
      throws DataProcessingException {
    Location memberLocation =
        ProfileService.getProfile(memberId).getMemberLocation( );
    PrivacySettings memberPrivacySettings =
        PrivacyService.getPrivacySettings(memberId);
    Collection<PatchRequest> defaults = null;
    switch (memberLocation) {
      case CHINA:
        defaults = CHINA_DEFAULT.values( );
        break;
      case EUROPE:
        defaults = EUROPE_DEFAULT.values( );
        break;
      case OTHER:
        defaults = OTHER_DEFAULT.values( );
        break;
    }
    for (PathSpec field : fields) {
      if(!memberPrivacySettings.contains(field))
        PatchApplier.applyPatch(memberPrivacySettings,
        defaults.get(field));
    }
    return memberPrivacySettings;
  }
}
```

In the above exemplary representation, the "PrivacySettingsGetter" class includes a set of hash maps named "CHINA_DEFAULT," "EUROPE_DEFAULT," AND "OTHER_DEFAULT." Each hash map also includes mappings from type "PathSpec" to type "PatchRequest" instead of from "PathSpec" to "Object." The "PatchRequest" type may represent a diff, and the constructor for the class uses a "PatchGenerator.diff( )" method to populate each entry in the hash map by generating the diff between a new instance of the "PrivacySettings" data object 210 and another new instance of "PrivacySettings" that has a given field set to the corresponding default value.

The "getMemberPrivacySettings" method in the exemplary representation above obtains the value of a "memberLocation" variable and an instance of data object 210 represented by "memberPrivacySettings" for the member identified by "memberId." The "getMemberPrivacySettings" also matches "memberLocation" to "CHINA," "EUROPE" or "OTHER" and retrieves the diffs containing default values 218-220 of fields 212 for the corresponding location. The "getMemberPrivacySettings" method then iterates through fields 212 of the "memberPrivacySettings" instance; when a field in the instance has not been set, the method calls an "applyPatch" method to apply a diff containing a default value for the field. After the method finishes setting the fields to the corresponding default values 218-220, the method returns the instance to the caller of the method (e.g., in a response to a request by the caller).

By using hash maps representing distinct conditions 222 to map from keys representing fields 212 to a "PatchRequest" type that stores default values 218-220 for fields 212 in one or more diffs of data object 210, data-processing system 202 guarantees the type safety of fields 212 and/or default values 218-220 during use of default values 218-220 with the corresponding fields 212 and/or conditions 222. Similarly, maintenance and modifications to the code are improved by replacing the if-else block in the previous naïve approach with a switch block that initializes default values for an instance of data object 210 based on the member location associated with the instance. In turn, new fields 212 and/or default values 218-220 based on conditions 222 may be added, modified, and/or deleted by updating the corresponding hash maps instead of requiring changes to both the hash maps and the "getMemberPrivacySettings" method. Consequently, the system of FIG. 2 improves the execution, correctness, maintenance, and use of computer systems, applications, services, and/or technologies for creating, modifying, and/or applying dynamic default values to data objects.

Those skilled in the art will appreciate that the techniques discussed above may be applied or adapted to other types of data objects, services, and/or APIs. For example, data-processing system 202 and/or service 208 may be used to apply default values 218-220 to fields 212 representing privacy settings, interests, and/or content based on conditions 222 such as age, age range, and/or user type (e.g., premium user, regular user, etc.). In another example, data-processing system 202 and/or service 208 may set a default value for a member's country based on the IP address of the member, when the member has not manually selected a country and/or location for his/her profile or account. In a third example, data-processing system 202 and/or service 208 may use various programming languages, APIs, frameworks, and/or diff or patch mechanisms to apply different sets of default values 218-220 to fields 212 of data objects based on conditions 222 associated with the data objects.

Figure 3:
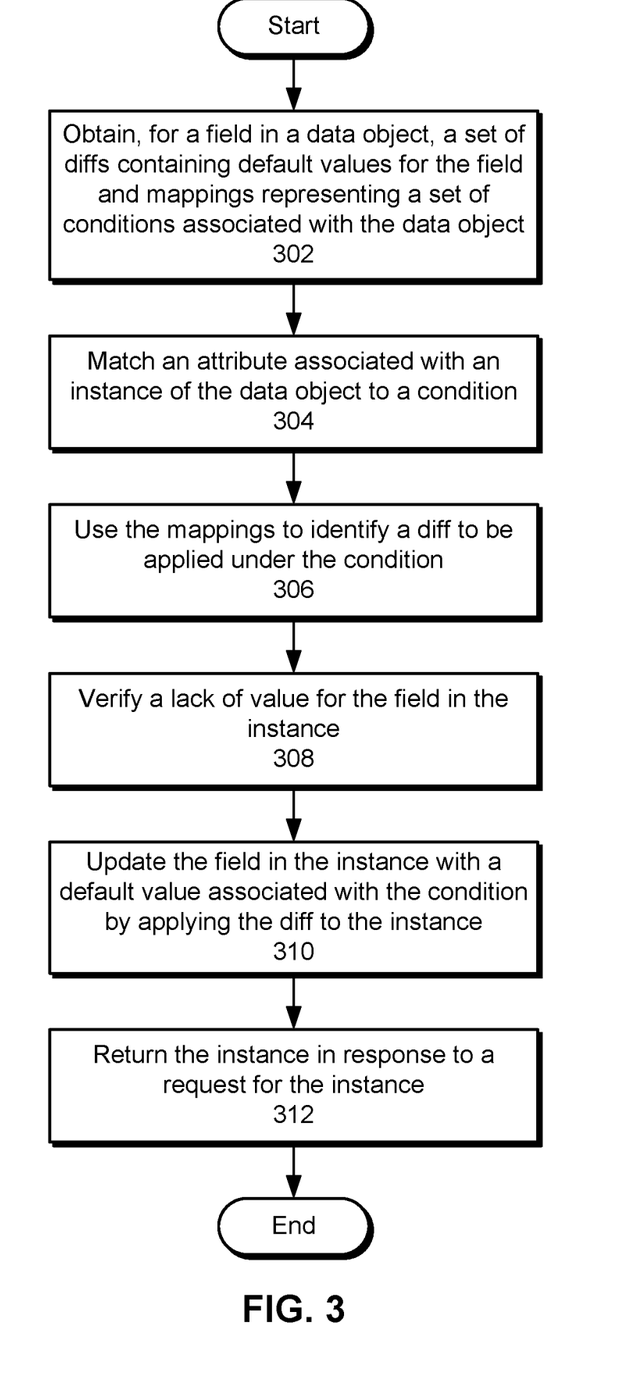
FIG. 3 shows a flowchart illustrating the processing of a data object in accordance with the disclosed embodiments.

FIG. 3 shows a flowchart illustrating the processing of a data object in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a set of diffs containing default values for a field in a data object are obtained, along with mappings representing a set of conditions associated with the data object (operation 302). For example, the diffs may store default values for fields representing privacy settings for members of an online network and/or other community, and the conditions may include locations, ages, age ranges, and/or other attributes of the members. Each condition may be associated with one or more mappings, and each mapping may include a field in the data object and a diff containing a default value that is applied to the field.

Next, an attribute associated with an instance of the data object is matched to a condition (operation 304), and the mappings are used to identify a diff to be applied under the condition (operation 306). Continuing with the previous example, the instance may include privacy settings for a member identified by a member ID. The member ID may be used to retrieve a location of the member, and the location may be matched to a country, continent, and/or region in which the member resides. A mapping representing the country, continent, and/or region may then be identified, and a diff containing the corresponding default value for the field may be obtained from the mapping.

A lack of a value for the field in the instance is then verified (operation 308) before the field in the instance is updated with a default value associated with the condition by applying the diff to the instance (operation 310). For example, a set of fields may be retrieved from the instance, and a diff containing a default value for a given field may be applied only if the field has not already been set. Using diffs to update fields in instances of data objects is described in further detail below with respect to FIG. 4.

Finally, the instance is returned in response to a request for the instance (operation 312). For example, operations 302-312 may be performed in response to a request to create and/or modify the instance and/or one or more fields in the instance.

Figure 4:
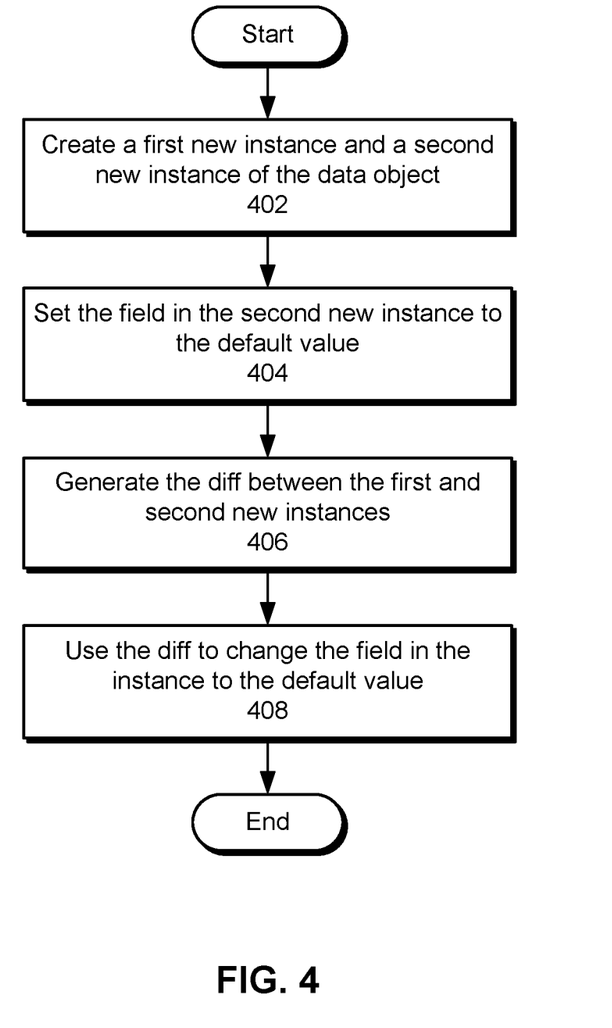
FIG. 4 shows a flowchart illustrating a process of updating a field in an instance of a data object in accordance with the disclosed embodiments.

FIG. 4 shows a flowchart illustrating a process of updating a field in an instance of a data object in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, a first new instance and a second new instance of the data object are created (operation 402), and the field in the second new instance is set to a default value (operation 404). For example, the field may represent a privacy setting (e.g., visibility of a member's last name and/or profile picture) that is set to a default value for a given location, age, age range, and/or other attribute of the member. During setting of the field to the default value, the type of the default value is verified, thereby ensuring type safety for the data object.

Next, a diff is generated between the first and second new instances (operation 406). As a result, the diff may include code and/or instructions for setting the field to the default value. The diff is then used to change the field in the instance to the default value (operation 408). For example, the diff may be applied to the instance, thereby writing the default value to the field within the instance.

Figure 5:
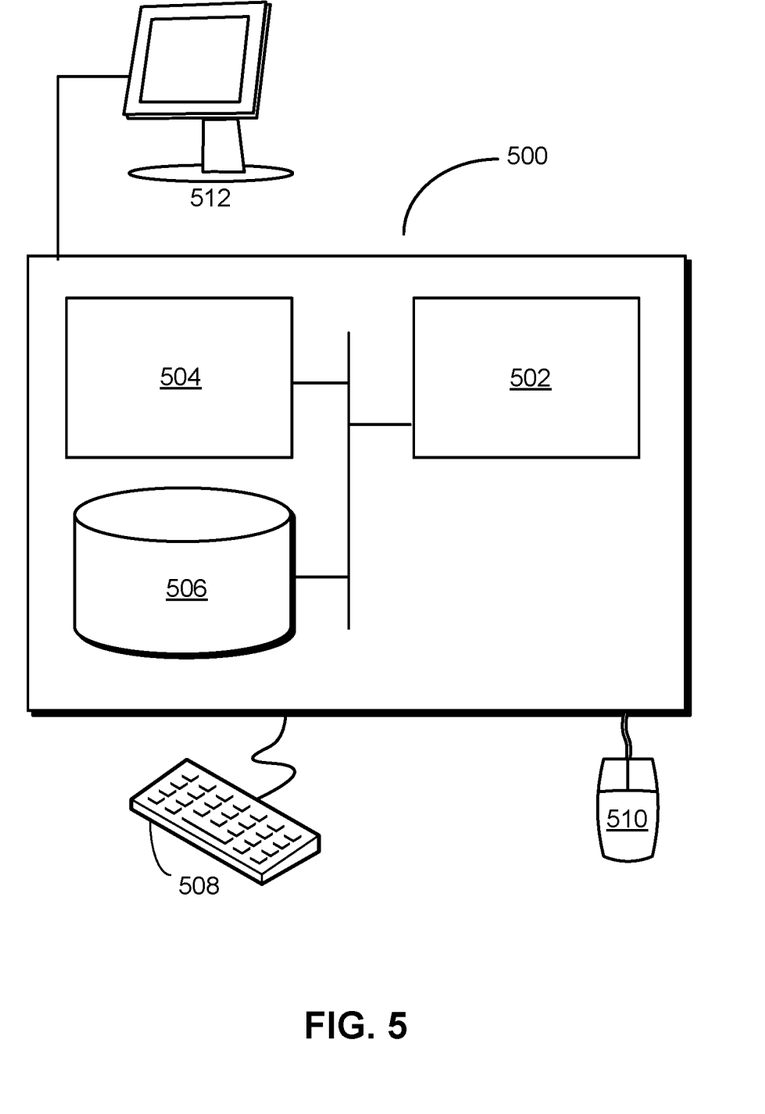
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system includes a service, which may alternatively be termed or implemented as a module, mechanism, or other type of system component. The service obtains, for a field in a data object, a set of diffs containing default values for the field and a set of mappings representing a set of conditions associated with the data object. Next, the service matches an attribute associated with an instance of the data object to a condition in the set of conditions. The service then uses the mappings to identify, in the set of diffs, a diff to be applied under the condition. Finally, the service updates the field in the instance with a default value associated with the condition by applying the diff to the instance In addition, one or more components of computer system 500 may be remotely located and connected to the other components over a network. Portions of the present embodiments (e.g., service, data-processing system, online professional network, etc.) may also be located on different nodes of a distributed system that implements the embodiments. For example, the present embodiments may be implemented using a cloud computing system that receives requests from a set of remote services and responds to the requests with instances of data objects.

By configuring privacy controls or settings as they desire, members of a social network, online professional network, or other user community that may use or interact with embodiments described, herein can control or restrict the information that is collected from them, the information that is provided to them, their interactions with such information and with other members, and/or how such information is used. Implementation of these embodiments is not intended to supersede or interfere with the members privacy settings.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining, for a field in a data object, a set of diffs comprising default values for the field and a set of mappings representing a set of conditions associated with the data object;
   matching, by a computer system, an attribute associated with an instance of the data object to a condition in the set of conditions;
   using the set of mappings to identify, in the set of diffs, a diff to be applied under the condition; and
   updating, by the computer system, the field in the instance with a default value associated with the condition by applying the diff to the instance;
   wherein updating the field in the instance with the default value associated with the condition comprises:
   creating a first new instance of the data object and a second new instance of the data object;
   setting the field in the second new instance to the default value; and
   generating the diff from the first new instance and the second new instance.

2. The method of claim 1, further comprising:
   verifying a lack of a value for the field in the instance prior to applying the diff to the instance.

3. The method of claim 1, further comprising:
   returning the instance with the updated field in response to a request for the instance.

4. The method of claim 1, further comprising:
   validating a type of the default value in the diff prior to updating the field in the instance with the default value.

5. The method of claim 1, wherein updating the field in the instance with the default value associated with the condition further comprises:
   using the diff to change the field in the instance to the default value.

6. The method of claim 1, wherein the data object comprises a set of privacy settings for a member of an online network.

7. The method of claim 6, wherein the condition comprises a location of the member.

8. The method of claim 6, wherein the field comprises a setting for showing a profile photo of the member.

9. The method of claim 6, wherein the field comprises a setting for showing a last name of the member.

10. A system, comprising:
    one or more processors; and
    memory storing instructions that, when executed by the one or more processors, cause the system to:
    obtain, for a field in a data object, a set of diffs comprising default values for the field and a set of mappings representing a set of conditions associated with the data object;
    match an attribute associated with an instance of the data object to a condition in the set of conditions;
    use the set of mappings to identify, in the set of diffs, a diff to be applied under the condition; and
    update the field in the instance with a default value associated with the condition by applying the diff to the instance
    wherein updating the field in the instance with the default value associated with the condition comprises:
    creating a first new instance of the data object and a second new instance of the data object
    setting the field in the second new instance to the default value; and
    generating the diff from the first new instance and the second new instance.

11. The system of claim 10, wherein the memory further stores instructions that, when executed by the one or more processors, cause the system to:
    verify a lack of a value for the field in the instance prior to applying the diff to the instance.

12. The system of claim 10, wherein the memory further stores instructions that, when executed by the one or more processors, cause the system to:
    return the instance with the updated field in response to a request for the instance.

13. The system of claim 10, wherein the memory further stores instructions that, when executed by the one or more processors, cause the system to:
    validate a type of the default value in the diff prior to updating the field in the instance with the default value.

14. The system of claim 10, wherein updating the field in the instance with the default value associated with the condition further comprises:
    using the diff to change the field in the instance to the default value.

15. The system of claim 10, wherein the data object comprises a set of privacy settings for a member of an online network.

16. The system of claim 15, wherein the condition comprises a location of the member.

17. The system of claim 15, wherein the field comprises at least one of:
    a first setting for showing a profile photo of the member; or
    a second setting for showing a last name of the member.

18. A non-transitory computer-readable storage medium storing instructions that when executed by a computer cause the computer to perform a method, the method comprising:
    obtaining, for a field in a data object, a set of diffs comprising default values for the field and a set of mappings representing a set of conditions associated with the data object;

matching an attribute associated with an instance of the data object to a condition in the set of conditions;

using the set of mappings to identify, in the set of diffs, a diff to be applied under the condition; and updating the field in the instance with a default value associated with the condition by applying the diff to the instance;

wherein updating the field in the instance with the default value associated with the condition comprises:

creating a first new instance of the data object and a second new instance of the data object;

setting the field in the second new instance to the default value; and generating the diff from the first new instance and the second new instance.

19. The non-transitory computer-readable storage medium of claim 18, wherein the method further comprising:

verifying a lack of a value for the field in the instance prior to applying the diff to the instance.

20. The non-transitory computer-readable storage medium of claim 18, wherein the method further comprising:

validating a type of the default value in the diff prior to updating the field in the instance with the default value.

* * * * *